US009148739B1

(12) United States Patent
Farahat

(10) Patent No.: US 9,148,739 B1
(45) Date of Patent: Sep. 29, 2015

(54) SYSTEM FOR DETECTING VEHICLE NOISE AND METHOD

(71) Applicant: KING FAHD UNIVERSITY OF PETROLEUM AND MINERALS, Dhahran (SA)

(72) Inventor: Ashraf M. Farahat, Kelowna (CA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 75 days.

(21) Appl. No.: 14/223,662

(22) Filed: Mar. 24, 2014

(51) Int. Cl.
*H04R 29/00* (2006.01)

(52) U.S. Cl.
CPC ............ *H04R 29/00* (2013.01); *H04R 2499/13* (2013.01)

(58) Field of Classification Search
None
See application file for complete search history.

(56) References Cited

U.S. PATENT DOCUMENTS 3,661,224 A 5/1972 Allen et al.
4,257,273 A 3/1981 Knowd
4,287,771 A 9/1981 Dugot
6,021,364 A * 2/2000 Berliner et al. .................. 701/1
6,094,150 A * 7/2000 Ohnishi et al. ................ 340/943
6,686,839 B2 2/2004 Lai et al.
6,690,294 B1 2/2004 Zierden
7,510,142 B2 3/2009 Johnson
8,555,721 B2 * 10/2013 Taillet ............................ 73/579
2004/0194549 A1 10/2004 Noel
2005/0100172 A1 * 5/2005 Schliep et al. ............... 381/71.4
2012/0083945 A1 4/2012 Oakley et al.
2012/0091284 A1 4/2012 Goodarzi
2013/0038692 A1 2/2013 Ohtomo et al.
2013/0238168 A1 9/2013 Reyes

FOREIGN PATENT DOCUMENTS

CN 101577051 A 11/2009
JP 2002-92789 3/2002

OTHER PUBLICATIONS

SJY CAM USA Website—http://www.skycamusa.com/ (Last Accessed on Feb. 5, 2014).

* cited by examiner

*Primary Examiner* — Paul Huber
(74) *Attorney, Agent, or Firm* — Richard C. Litman

(57) ABSTRACT

A system to detect excessive noise is provided to monitor sources, such as cars, that produce levels of noise above a certain threshold predetermined by local authorities. The system to detect excessive noise includes a microphone and a camera that are in communication with a filter circuit. The microphone is configured to detect noise above a given frequency. The frequency range can vary depending on the local rules and regulations for acceptable noise levels. If the frequency of the noise is above a given frequency, the current produced by the microphone passes through the filter circuit where the current is amplified. The amplified current activates a camera to take pictures of the source of the excessive noise. The camera can contain a global positioning satellite (GPS) unit to record the location coordinates. The filter circuit can be adapted to communicate wirelessly with the camera.

20 Claims, 5 Drawing Sheets

Transmitter
60
Camera

SYSTEM FOR DETECTING VEHICLE NOISE AND METHOD

BACKGROUND OF THE INVENTION

1. Field of the Invention

The present invention generally relates to a noise detection system, and more particularly to a vehicle noise detection system for detecting and collecting information relating to excessive vehicle noise.

2. Description of the Related Art

Elevated sound levels can cause health issues, including hearing impairment, hypertension and sleep disturbance. Some birth defects have also been linked to excessive exposure to noise. As the world population continues to grow, so have the number of vehicles that are being used on the world's highways and metropolitan cities. With respect to vehicle monitoring systems, local authorities and law enforcement have employed devices such as radar detectors to detect speeding vehicles and red-light cameras to detect vehicles that fail to stop at red lights or signs. These measures have been employed to enforce the laws, as well as to deter unsafe driving. In addition to vehicle operation monitoring, many countries have imposed environmental restrictions to control carbon dioxide vehicle emissions. While governments have developed laws and regulations to address the speed at which people drive, vehicle fuel efficiency as well as the emissions produced by vehicles, in order to protect the public, very little attention has been given address to noise pollution produced by vehicles on the roads today.

Occasionally, vehicle drivers use their car horns unnecessarily and/or excessively to signal displeasure or frustration with the flow of traffic or the driving of other drivers. The excessive horn usage is not only annoying, but can be potentially dangerous, considering the aforementioned health related issues caused by excessive noise. Excessive car horn usage can be observed virtually everywhere, including big cities such as Cairo, Riyadh, Rome, Delhi, Dubai, Beijing, Shanghai, London, and New York City, among many others. Further, it is commonly known that excessive car music sound can be equally as annoying as excessive car horn usage. To maintain orderly and responsible vehicle operation, there exists a need to deter drivers from excessive noise emission and to enforce noise pollution laws. Accordingly there exists a need for a system to detect excessive noise by a vehicle, and record information related to the offending vehicle.

Thus, a system for detecting excessive noise solving the aforementioned problems is desired.

SUMMARY OF THE INVENTION

The system to detect excessive noise is provided to monitor sources, such as cars, that produce levels of noise above a certain threshold level predetermined by local authorities. The system to detect excessive noise comprises a microphone and a camera that are in communication with a filter circuit. The microphone is configured to detect noise above or within a given frequency, such as 0.5-3.0 kHz. The frequency range can vary depending on the local rules and regulations for acceptable noise levels. If the frequency of the noise is below the predetermined threshold, the system is not activated.

If the frequency of the noise is above or within a given frequency, the current produced by the microphone passes through the filter circuit. The filter circuit comprises at least one operational amplifier ((RAMP). As the current passes through the filter circuit it is amplified to a certain magnitude, such as 10 times the current's original voltage. The amplification magnitude can also vary depending on the local rules and regulations for acceptable noise levels. The amplified current produced by the filter circuit activates a camera, such as a traffic camera, to take pictures of the source of the excessive noise. The camera can contain a global positioning satellite (GPS) unit to record the location coordinates. The filter circuit can be adapted to communicate wirelessly with the camera. The image and the coordinates are then transmitted to a local station so that the excessive noise issue can be addressed.

These and other features of the system for detecting excessive noise will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
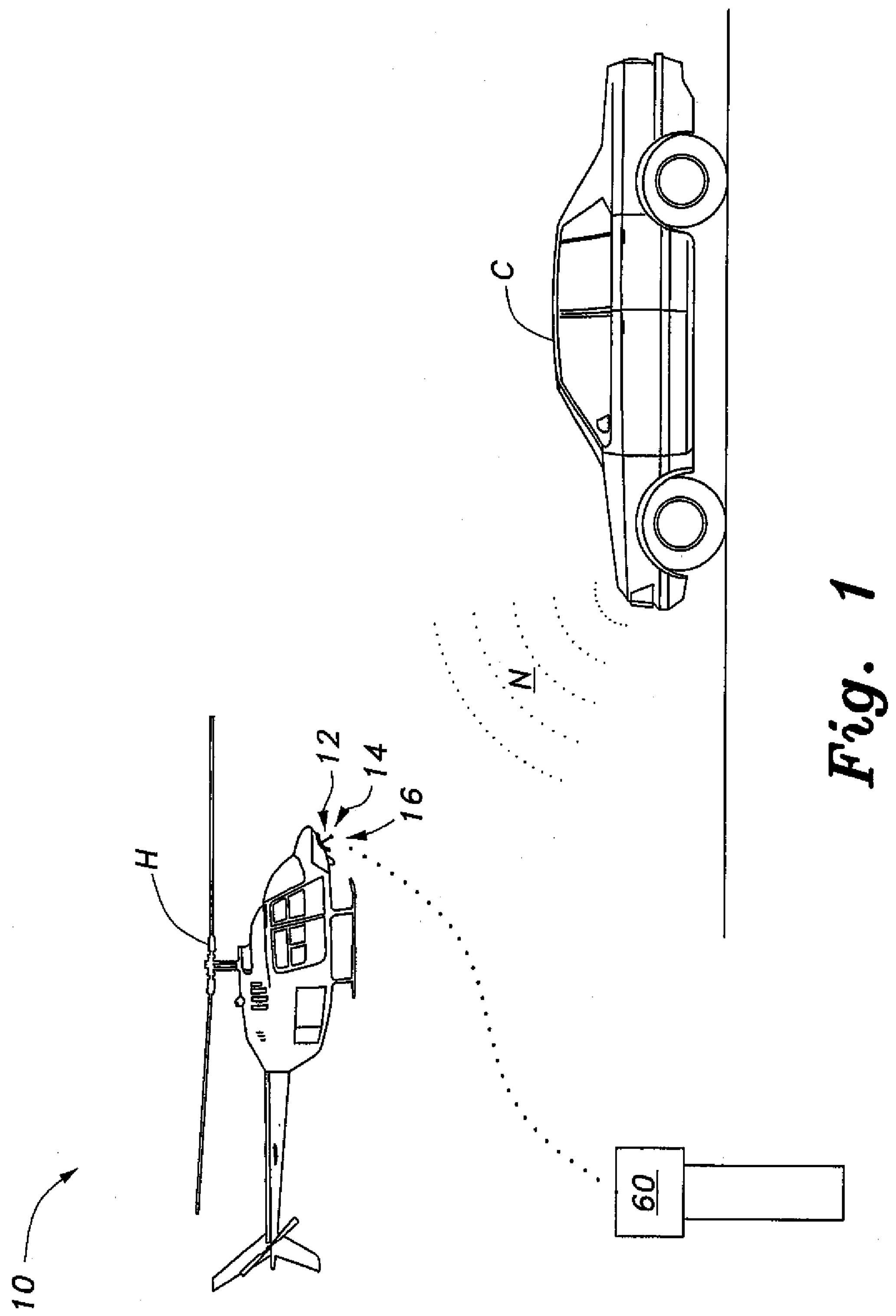
FIG. 1 is an environmental schematic view of a vehicle noise detection system for detecting vehicle noise in cooperation with a remote control helicopter, according to the present invention.

Referring now to FIG. 1, there is shown an embodiment of a vehicle noise detection system 10 for detecting noise N. As shown, the vehicle noise detection system 10 is adapted to operate in conjunction with a remote control helicopter H, or similar airborne device. The noise detection system 10 is adapted to selectively detect noise N emitted from vehicles or cars C and record and/or photograph the vehicle's information, for the purposes of monitoring and law enforcement. With respect to the ground, the location and elevation of the helicopter H can vary depending on the type and sensitivity of microphone being used, as well as environmental factors, such as daytime or nighttime or whether it is raining or snowing. The vehicle noise detection system 10 generally includes a microphone 12 for detecting sound emitted from the vehicle, a filter circuit 14 for detecting a preselected frequency or frequency range, a transmitter 15 for transmitting a signal from the filter circuit 14, a camera 16, such as a traffic camera for capturing images of the car(s) emitting the sound, a power source 18 (FIG. 2), and a control system 60, in communication with the microphone 12, filter circuit 14 and camera 16.

The vehicle noise detection system 10 is adapted to selectively detect noise N at a preselected frequency range, which can be a frequency above a predetermined noise level. As shown, the remote control helicopter H or device can be aerially positioned over a roadway or traffic to selectively detect noise emitted from cars C at a preselected frequency. The vehicle noise detection system 10 is configured to capture data, and/or images of the car C and/or source of the noise, such that law enforcement and/or local municipality can address the problem.

As shown, the microphone 12 and filter circuit 14 can be provided on the helicopter H to detect vehicle noise. Alternatively, the microphone 12, filter circuit 14 and camera 16 can also each be positioned at different respective locations proximate to car C traffic. Notably, the microphone 12 can be an omnidirectional, unidirectional, cardioid, bi-directional, or shotgun type microphone, and can vary depending on the environment in which the noise detection system is in operation.

To provide accuracy in detecting noise emitted from a car C or group of cars C, it is further contemplated that the noise detection system 10 can include a GPS and/or similar device generally known, to ascertain and record the location and/or coordinates of the offending vehicles C. As such, the authorities can locate the high frequency sounds and pin point the source producing the offending sound(s) at that location. Although the aforementioned components of vehicle noise detection system 10 are shown in a generally connected configuration, it is contemplated that these components can also operate remotely using wireless technology generally known.

Figure 2:
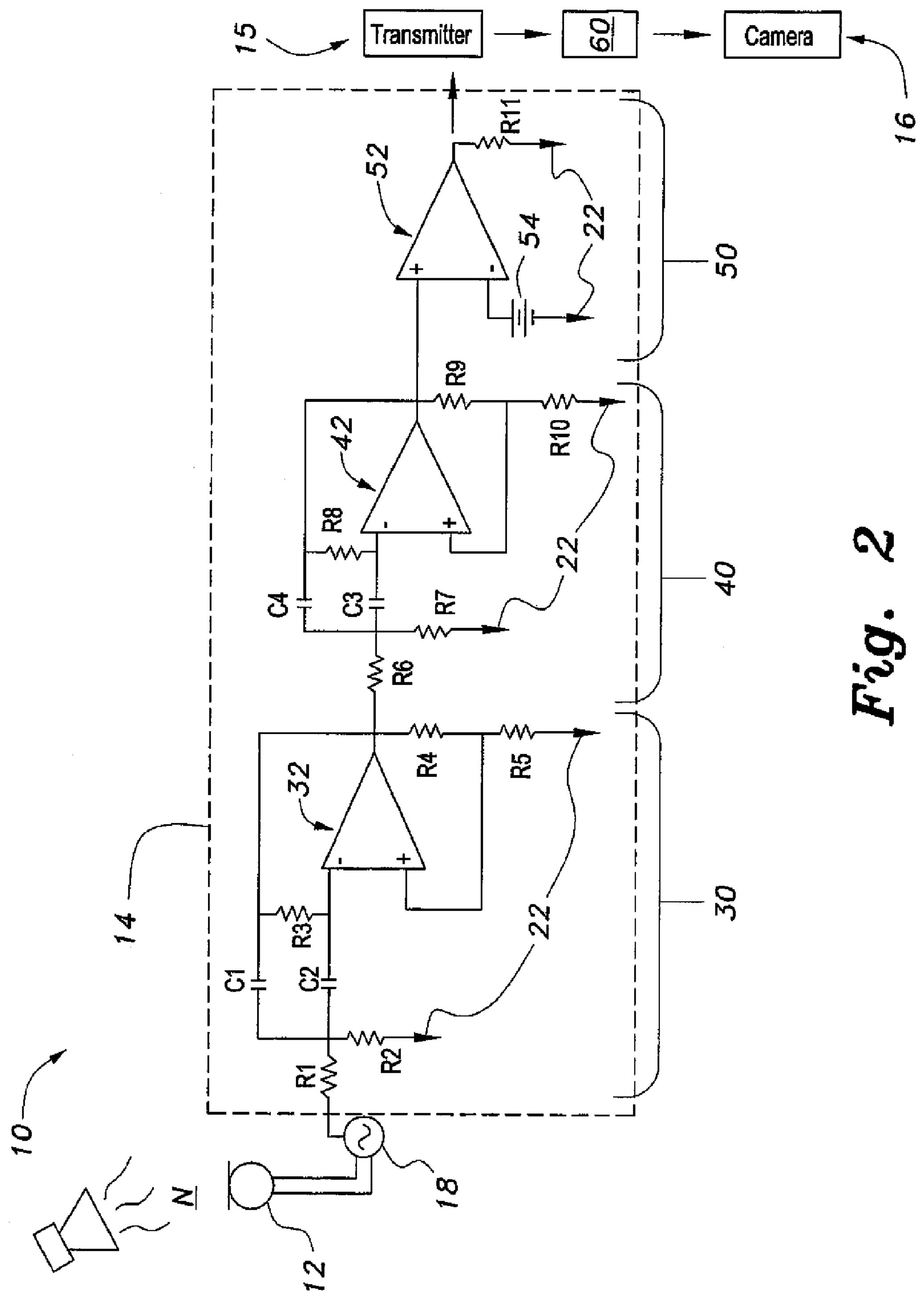
FIG. 2 is a circuit diagram for the vehicle noise detection system of FIG. 1, according to the present invention.

Continuing now to FIG. 2, there is shown an illustration of an example filter circuit 14 for filtering sounds emitted from one or more cars C. As shown, the filter circuit 14 can be operatively connected to the microphone 12 to receive input therefrom. Further, the filter circuit 14 is in communication with the control system 60 and camera 16 via the transmitter 15. The microphone 12 is connected to a power source 18. The power source 18 can be a direct current (DC) power supply derived from a battery, such as a 12 volt DC battery, or solar technology, such as solar panels, for example.

The microphone 12 in cooperation with the filter circuit 14, differentiates between common environmental sounds, and sounds that are generated by cars C, such as a horn, that fall within a preselected frequency. Notably, the selected frequency that the microphone detects can be varied according to a municipality's requirements. For example, in the case that a noise N is detected by the microphone 12 containing a frequency above or within a predetermined threshold level, such as 0.5 to 3.0 mHz, the microphone will produce a signal and/or electrical current. The current will pass through the filter circuit 14 to the transmitter 15, and activate the camera 16 to record the source of the noise N.

As shown, the filter circuit 14 is in communication with the microphone 12. The filter circuit 14 includes at least one OPAMP and one or more stages to filter the preselected frequency. The filter circuit 14 can include a first stage 30, a second stage 40 and a third stage 50. As shown, the first stage 30 can be connected to the microphone 12 and includes an input to receive output from the microphone 12. The first stage 30 includes a first resistor R1, with a resistance of 442 kΩ, a second resistor R2, with a resistance of 8400 kΩ, a first capacitor C1, with a capacitance of 1 nF, a second capacitor C2, with a capacitance of 1 nF, a third resistor R3, with a resistance of 6.7 kΩ, a first OPAMP 32, a fourth resistor R4, with a resistance of 486 kΩ, and a fifth resistor R5, with a resistance of 57.3 kΩ. As illustrated in FIG. 2, R2 and R3 can be arranged in a parallel configuration and R4 and R5 can be arranged in a series configuration. The microphone 12 and the power source 18 can also be configured in a series configuration.

The second stage 40 input can receive output from the first stage 30. The second stage 40 includes a sixth resistor R6, with a resistance of 526 kΩ, a seventh resistor R7, with a resistance of 10,000 kΩ, a third capacitor C3, with a capacitance of 2.46 nF, a fourth capacitor C4, with a capacitance of 2.46 nF, an eighth resistor R8, with a resistance of 8 kΩ, a second OPAMP 42, a ninth resistor R9, with a resistance of 831 kΩ, and a tenth resistor R10, with a resistance of 98 kΩ. As illustrated in FIG. 2, R7 and R8 can be arranged in a parallel configuration and R9 and R10 can be arranged in a series configuration.

The third stage 50 has an input that receives output from the second stage 40. The third stage 50 has a third OPAMP 52, a reference potential 54, which can be 50 mV, and an eleventh resistor R11, with a resistance of 100 kΩ. The voltage of the filter circuit 14 can be measured from the ground 22.

Notably, the above-referenced resistance and capacitance values can vary depending on the requisite frequency range that is required to be detected by the microphone. The above-referenced values are suitable to filter a signal in the range of about 0.5-3.0 kHz and to amplify the signal 10 times. However, it is to be understood that the frequency range and the amplification magnitudes are only given as an example, and that the filter circuit 14 frequency filter levels can be selectively modified to conform to the selected frequency that local laws and regulations were implemented to regulate. Once the current passes through the third stage 50 of the filter circuit 14, the amplified current is transmitted by the transmitter 15 to activate the camera 16 via a control system 60 to record and/or photograph an image of the detected source, such as a car C, producing the excessive noise N. Upon detection, the camera 16 and control system 60 can store the images into memory 68 (FIG. 3).

Figure 3:
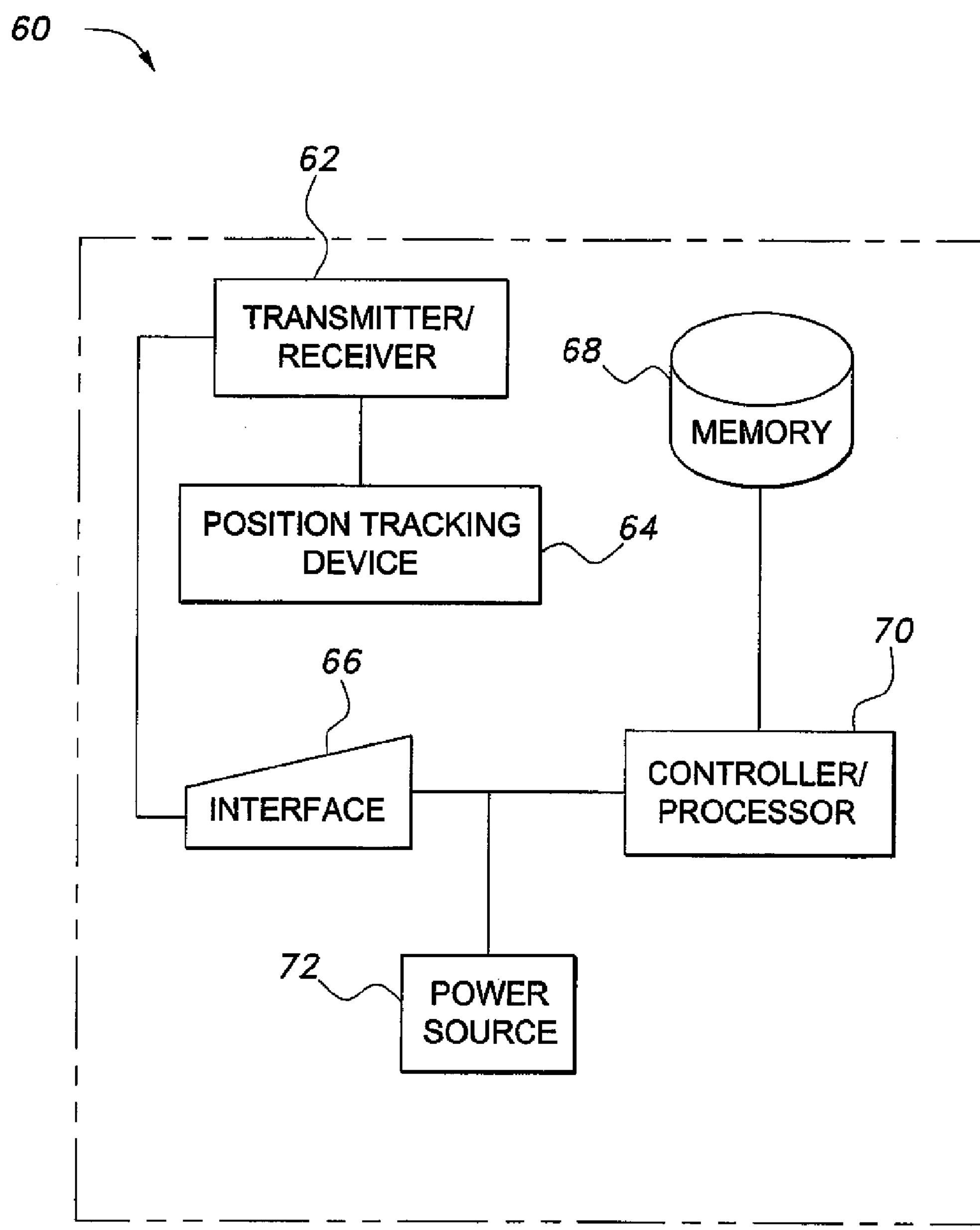
FIG. 3 is a diagram of a control system for use in combination with embodiments of the vehicle noise detection system of FIG. 1, according to the present invention.

Continuing now to FIG. 3, there is shown a control system 60 for implementing embodiments of apparatuses and methods for controlling activation of the camera 16. The control system 60 can include components for implementing a control unit in the camera 16. It should be understood that the control system 60 can represent, for example, a microcontroller, an application specific integrated circuit (ASIC), or a programmable logic controller (PLC), for example.

Data can be sent from or by the filter circuit 14 via the transmitter 15 or any suitable type of wireless communication to a transmitter/receiver 62 that is in communication with an interface 66 in the generalized system 60. The transmitter/receiver 62 can be associated with a position tracking device 64, such as can send and receive signals as to a location of the source, such as a car C, of the excessive noise. For example, the position tracking device 64 can be associated with a GPS device, so as to provide information as to a position or location of the source, such as a car C, of the excessive noise. Also the transmitter/receiver 62 can receive data or control signals from the filter circuit 14 and can send data to a local station alerting the authorities of the excessive noise.

The control system 60 can also include a memory 68 to store data and information. The memory 68 can be any suitable type of computer readable and programmable memory. Examples of computer readable media include a magnetic recording apparatus, non-transitory computer readable storage memory, an optical disk, a magneto-optical disk, and/or a semiconductor memory (for example, RAM, ROM, etc.). Examples of magnetic recording apparatus that may be used in addition to memory 68, or in place of memory 68, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

The controller/processor 70 can be any suitable type of computer processor, such as a microprocessor or an ASIC, and the calculations, determinations, data transmission or data reception, sending or receiving of control signals or commands processed or controlled by the filter circuit. The control system 60 can also be powered by a system power source 72, such as a battery, for example, as can power operation of the microphone 12.

The controller/processor 70 can be associated with, or incorporated into, any suitable type of camera 16. The controller/processor 70, the transmitter/receiver 62, the position tracking device 64, the memory 68, the interface 66, and any associated computer readable media are in communication with one another by any suitable type of data bus, as is well known in the art.

Figure 4:
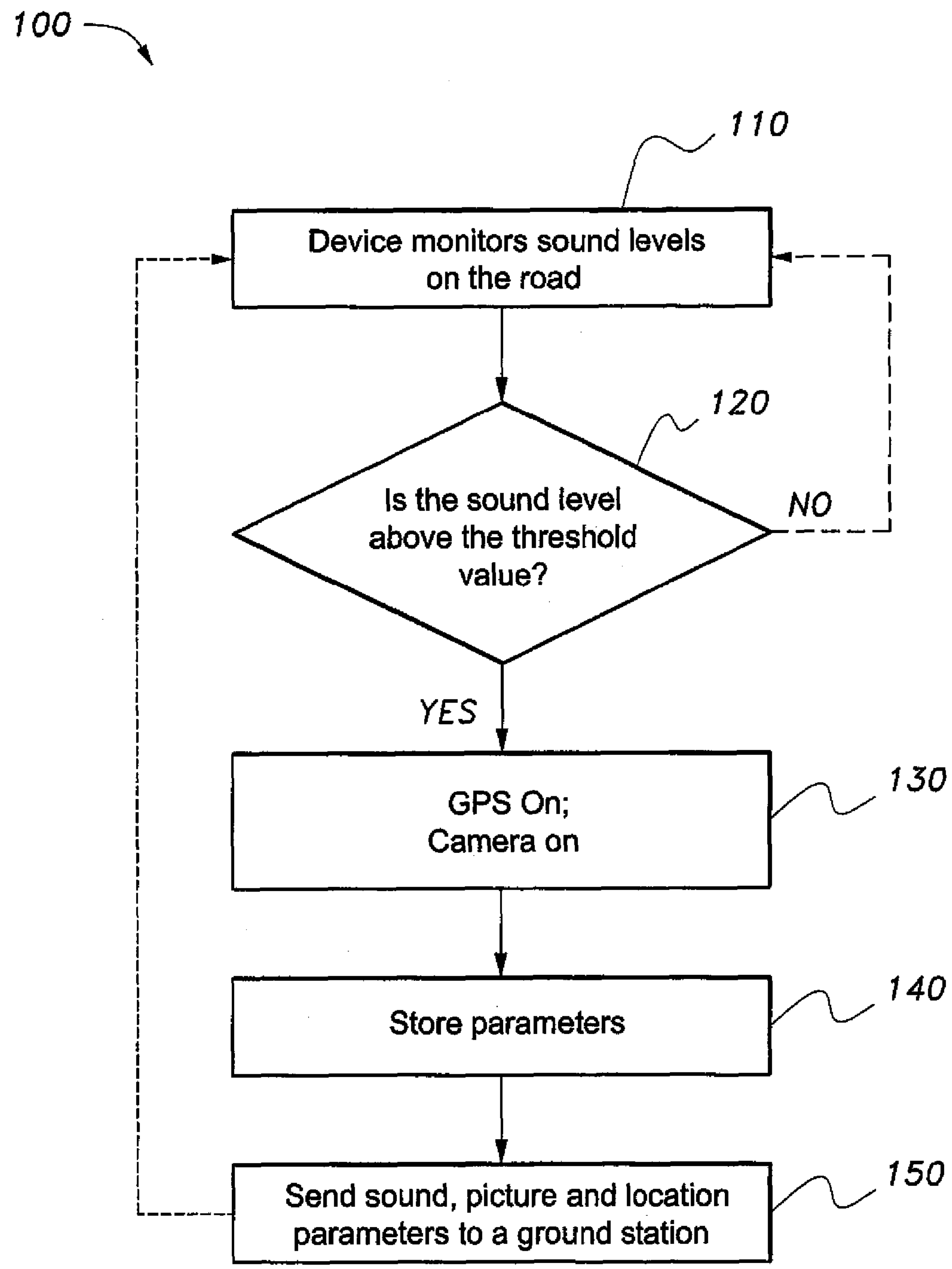
FIG. 4 is a flowchart of an exemplary method for detecting excessive noise, according to the present invention.
Figure 5:
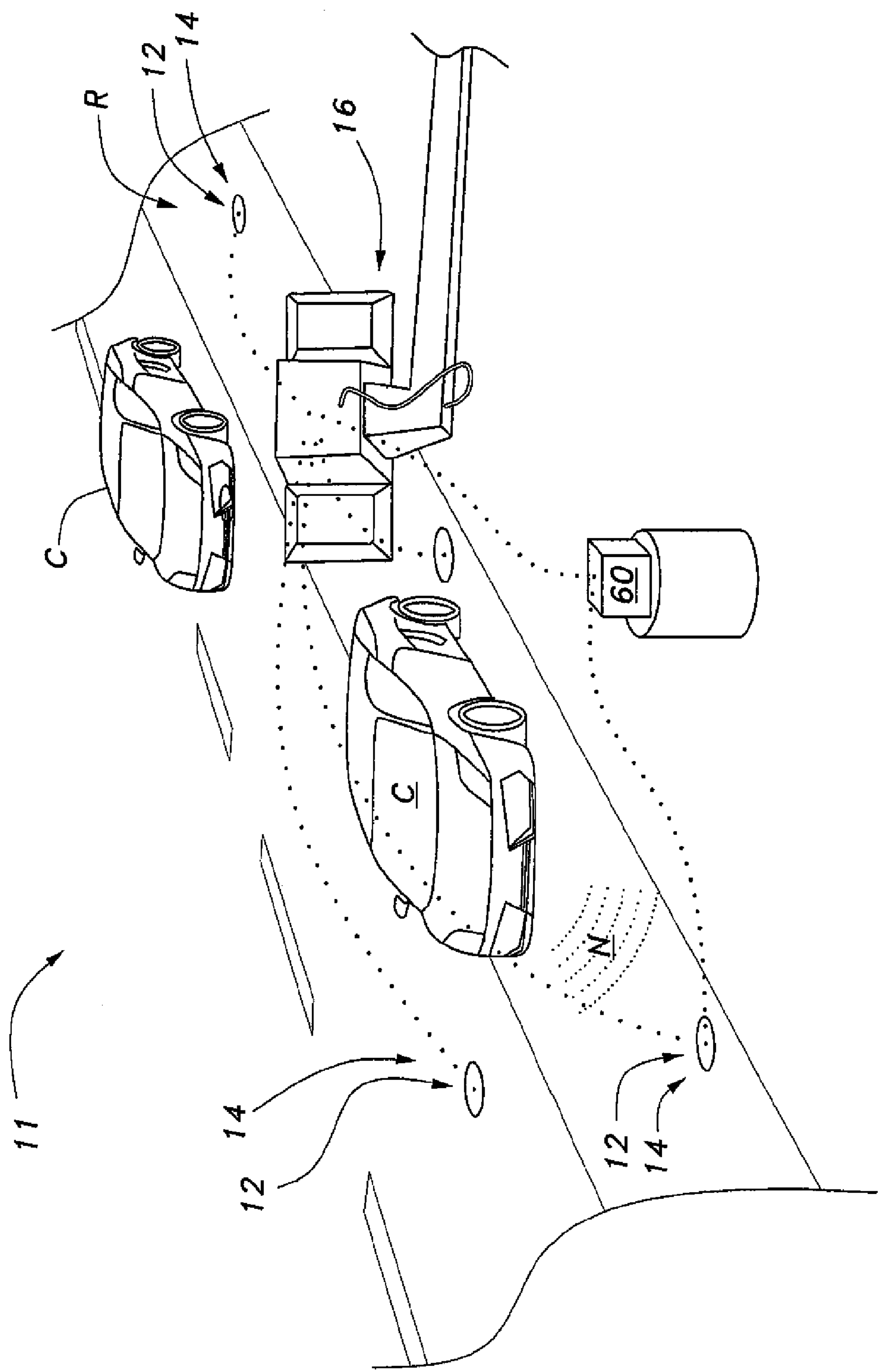
FIG. 5 is an environmental perspective view of an embodiment of the vehicle noise detection system, illustrating a detection microphone and filter circuit embedded in a roadway, according to the present invention.

FIG. 4 illustrates a method 100 for using the noise detection system 10 to detect sources producing sounds above a certain threshold level. The microphone 12 (FIG. 2) is adapted to selectively detect and monitor sound levels on the road 110, regardless of whether the microphone 12 (FIG. 2) is provided on the road R or helicopter H, as illustrated in FIGS. 1 and 5. If the sound level frequency is below the threshold level set forth by the laws and regulations, the circuit will not be activated and the microphone 12 (FIG. 2) will keep monitoring the roadways for sound levels above the threshold level 120. In the event that the sounds level or frequency is above the threshold level, the GPS 64 (FIG. 3) and camera 16 (FIG. 2) will be activated 130 by the noise detection system 10. As such, the GPS 64 (FIG. 3) develops location coordinates of the sound source, and an image of the source of noise can be stored by the camera 16 (FIG. 2) on the noise detection system 140 and/or wirelessly transmitted to the ground station 150 for further action.

Continuing now with reference to FIGS. 2 and 5, there is shown an embodiment of the noise detection system 11. As shown, the system 11 is configured to detect excessive sound generated on a segment of a road R. Similar to the embodiment shown in FIG. 1, the noise detection system 11 includes at least one microphone 12, a filter circuit 14, a transmitter 15, a camera 16, such as a traffic camera, and a power source 18. The microphone 12, the transmitter 15, and the camera 16 are in communication with the filter circuit 14, which in this example can be embedded in the road R to detect vehicle sound. As shown, the noise detection system 11 can operate wirelessly without the components being coupled together. In operation, as the car(s) C travel along the road R, the microphones 12, in cooperation with the filter circuits 14, detect the noise N being emitted from car(s) C. Upon detecting a noise N that has a frequency above a predetermined acceptable level, the microphone 12 will send a signal through the filter circuit 14 and the transmitter 15 to wirelessly communicate with the camera 16.

The wireless signal sent from the microphone 12 can activate the camera 16 so that the camera 16 can capture an image of the source of the noise, such as a car C, so that the authorities can address the noise violation. Similar to the previous embodiment of FIG. 1, the filter circuit 14 can send data through the transmitter 15 to the transmitter/receiver 62 (FIG. 4) and communicate with the camera 16 via wireless communications, such as GSM, CDMA and GPRS, to 3G networks such as W-CDMA, EDGE or CDMA2000, 4G, and other wireless means. The camera 16 can also be configured to record the GPS coordinates as to the location of the source of the excessive noise.

It is to be understood that the present invention is not limited to the embodiments described above, but encompasses any and all embodiments within the scope of the following claims.

I claim:

1. A system for detecting excessive noise, the system comprising:

a microphone adapted to selectively detect sound;

a filter circuit in communication with the microphone, the filter circuit being adapted to amplify current;

a camera in communication with the filter circuit; and, a power source to provide power to the microphone;

wherein the microphone detects sounds within a preselected frequency from a source and produces a current, the current passes through the filter circuit, the filter circuit amplifies current to a preselected magnitude to activate the camera and the camera takes a photo of the source emitting the sound within the frequency.

2. The system according to claim 1, wherein the selected frequency is in the range of about 0.5 to 3.0 mHz.

3. The system according to claim 1, wherein the current traveling through the filter circuit is amplified by 10 times the original magnitude.

4. The system according to claim 1, wherein the power source is a direct current power supply.

5. The system according to claim 1, wherein the filter circuit is in wireless communication with the camera.

6. The system according to claim 1, wherein the filter circuit comprises at least one operational amplifier.

7. The system according to claim 1, wherein the filter circuit comprises at least two stages.

8. The system according to claim 1, wherein the system is adapted to operate in conjunction with a remote controlled helicopter.

9. The system according to claim 1, wherein the system is adapted to operate in conjunction with a road and the filter circuit and microphone are embedded in the road.

10. A system for detecting excessive noise, the system comprising:

a microphone adapted to detect sounds with a frequency in the range of about 0.5 to 3.0 kHz;

a filter circuit in communication with the microphone; wherein the microphone produces a current to pass through the filter circuit and the filter circuit amplifies the current 10 times the current's original voltage;

a camera in communication with the filter circuit, wherein the filter circuit is adapted to wirelessly communicate with the camera; and, a power source coupled to the microphone to provide power to the microphone;

wherein the microphone detects sounds within a frequency in the range of about 0.5 to 3.0 kHz and produces a current, the current passes through the filter circuit, the filter circuit amplifies the current 10 times the current's original voltage to activate the camera, the camera takes images of source emitting sounds within the frequency.

11. The system according to claim 10, wherein the power source is a direct current power supply.

12. The system according to claim 10, wherein the filter circuit comprises:

a plurality of stages; and, at least one operational amplifier.

13. The system according to claim 10, wherein the system is adapted to operate in conjunction with a remote control helicopter.

14. The system according to claim 10, wherein the system is adapted to operate on a road.

15. A method for detecting excessive noise, comprising the steps of:

selectively detecting sounds within a selected frequency; and, photographing a source producing sounds with the frequency.

16. The method for detecting excessive noise according to claim 15, further comprising the step of producing a current.

17. The method for detecting excessive noise according to claim 15, further comprising the step of wirelessly transmitting GPS coordinates and an image to a station.

18. The method for detecting excessive noise according to claim 15, wherein the selected frequency is in the range of about 0.5 to 3.0 kHz.

19. The method for detecting excessive noise according to claim 16, further comprising the step of amplifying the current to a preselected magnitude.

20. The method for detecting excessive noise according to claim 19, wherein the selected magnitude is 10 times the original magnitude of the current.

* * * * *